United States Patent
Tammana et al.

(10) Patent No.: US 12,035,302 B1
(45) Date of Patent: Jul. 9, 2024

(54) SERVICE BASED UPLINK SCHEDULING IN COMMUNICATION NETWORKS

(71) Applicant: T-Mobile Innovations LLC, Overland Park, KS (US)

(72) Inventors: Deepak Nadh Tammana, Bothell, WA (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 226 days.

(21) Appl. No.: 17/462,892

(22) Filed: Aug. 31, 2021

(51) Int. Cl.
*H04W 72/1263* (2023.01)
*H04W 72/0446* (2023.01)
*H04W 72/23* (2023.01)
*H04W 72/54* (2023.01)

(52) U.S. Cl.
CPC ... *H04W 72/1263* (2013.01); *H04W 72/0446* (2013.01); *H04W 72/23* (2023.01); *H04W 72/54* (2023.01)

(58) Field of Classification Search
CPC ......... H04W 72/1263; H04W 72/0446; H04W 72/23; H04W 72/54
See application file for complete search history.

(56) References Cited

U.S. PATENT DOCUMENTS

| 2005/0036466 A1* | 2/2005 | Malik | H04L 47/10 370/468 |
| 2016/0308786 A1* | 10/2016 | Chen | H04L 47/826 |
| 2020/0344838 A1* | 10/2020 | Wu | H04W 76/28 |

FOREIGN PATENT DOCUMENTS

| CN | 110621035 A | * 12/2019 | |
| GB | 2572443 A | * 10/2019 | H04W 72/08 |

OTHER PUBLICATIONS

Translation of CN-110830964-A, dated Feb. 2020 (Year: 2020).*

* cited by examiner

*Primary Examiner* — Nishant Divecha
(74) *Attorney, Agent, or Firm* — Shook, Hardy & Bacon L.L.P.

(57) ABSTRACT

Systems, methods, and computer-readable media herein modify and/or instruct a proactive scheduling scheme of a communication network based on service level information associated with one or more UE devices. The service level information of the UE devices may be used to determine a frequency and duration for issuing proactive scheduling grants used to maintain a communication connection between a base station and the UE devices thus improving efficiency, latency, and power consumption for UE devices transmitting uplink data.

10 Claims, 8 Drawing Sheets

SERVICE BASED UPLINK SCHEDULING IN COMMUNICATION NETWORKS

SUMMARY

The present disclosure is directed, in part, to service based uplink scheduling in communication networks, substantially as shown in and/or described in connection with at least one of the figures, and as set forth more completely in the claims.

In aspects set forth herein, a scheduling frequency may be assigned to one or more devices based at least partly on information associated with the one or more devices, including information indicating a service level associated with the one or more devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AWS | Advanced Wireless Services |
| BRS | Broadband Radio Service |
| BTS | Base Transceiver Station |
| CDMA | Code Division Multiple Access |
| CSI-RS | Channel State Information Reference Signal |
| EBS | Educational Broadband Services |
| eNodeB | Evolved Node B |
| EVDO | Evolution-Data Optimized |
| gNodeB | Next Generation Node B |
| GPS | Global Positioning System |
| GSM | Global System for Mobile Communications |
| HRPD | High Rate Packet Data |
| eHRPD | Enhanced High Rate Packet Data |
| IoT | Internet of Things |
| LTE | Long Term Evolution |
| LTE-A | Long Term Evolution Advanced |
| PCS | Broadband Personal Communications Service |
| RSRP | Reference Transmission Receive Power |
| RSRQ | Reference Transmission Receive Quality |
| RSSI | Received Transmission Strength Indicator |
| SINR | Transmission-to-Interference-Plus-Noise Ratio |
| SNR | Transmission-to-noise ratio |
| WCS | Wireless Communications Service |
| WiMAX | Worldwide Interoperability for Microwave Access |

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Uplink proactive scheduling allows for the link or connection between a UE device and a BTS (e.g., base station) in an active state. Proactive scheduling may include allocating and issuing "dummy" proactive scheduling grants to the UE device, where the UE device may not be transmitting any uplink data. The proactive scheduling grants act to maintain the UE registration or network attachment to a BTS. Since network attachment is maintained by the proactive scheduling grants, UE devices are able to transmit uplink data without having to re-attach to a BTS, thus reducing latency, jitter (e.g., variability in latency), and wait time experienced by a user of the UE device. However, issuing proactive scheduling grants may cause higher resource consumption even though non-grant related data is not sent in uplink transmissions. For instance, proactive scheduling grants may result in increased network interference or power consumption in the UE device. In a UE device such as a mobile phone, this increased power consumption may cause diminished battery life. The nature and activity of some UE devices make them more suitable for proactive scheduling, and take advantage of the reduced latency and jitter, while other UE devices do not perform operations for which proactive scheduling would realize a benefit, and in some circumstances, proactive scheduling may be to the UE device's detriment. For example, a mobile device (e.g., a UE device) may be used for online real-time gaming and require low latency, while a cellular Internet of Things (IoT) device may only infrequently transmit uplink data and may have a less strict or no latency requirement. In conventional communication systems, each UE device is treated the same in regard the frequency that is assigned for proactive scheduling grants the UE device without regard to attributes or service level of the device or uplink transmissions associated with the device.

At a high level, systems, methods, and computer-readable media of the present invention assign a proactive scheduling frequency to a device based on a service level associated with the device. The systems, methods, and computer-readable media disclosed herein may provide an improved efficiency, quality, power consumption, and user experience for UE devices that transmit uplink data. By basing the proactive scheduling frequency assigned to a device on the service level associated with the device, a base station can configure a scheduling time and a scheduling frequency that corresponds to the service level associated with that particular device. For example a device associated with a higher service level (e.g., low latency requirements) may be assigned a greater scheduling frequency than a device associated with a lower service level. Assigning a scheduling frequency based on service level enables an optimized utilization of scheduling resources such as low latency network performance in devices while reducing power consumption.

In a first aspect of the present invention, a method is provided. The method comprises receiving information associated with a device. The information may comprise data indicating a service level for the device. The method further comprises determining, based on the information associated with the device, that the data indicating a service level exceeds a service threshold. The method further comprises, assigning a scheduling frequency to the device based on determining that the data indicating a service level exceeds a service threshold.

In a second aspect of the present invention, computer-readable media is provided, the computer-readable media having computer-executable instructions embodied thereon that, when executed, perform a method. In accordance with the media, information associated with a device operating on a first scheduling frequency is received. In some embodiments, the information associated with the device comprises a value that indicates a service level for the device. The method further comprises, determining, based on the information associated with the device, that the value indicating a service level exceeds a service threshold. The method further comprises modifying the first scheduling frequency associated with the device to a second scheduling frequency.

In a third aspect of the present invention, a system is provided. The system comprises one or more processors that are configured to execute operations. The operations may comprise, receiving, by the one or more processors, information associated with a device. In some embodiments, the device may be operating on a first scheduling time and the information associated with the device may comprise a value indicating a service level for the device. The operations may further comprise determining, by the one or more processors, that the value indicated a service level for the device exceeds a service threshold. The operations may further comprise modifying the first scheduling time to a second scheduling time based on determining that the value indicating a service level exceeds the service threshold.

As used herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

Figure 1:
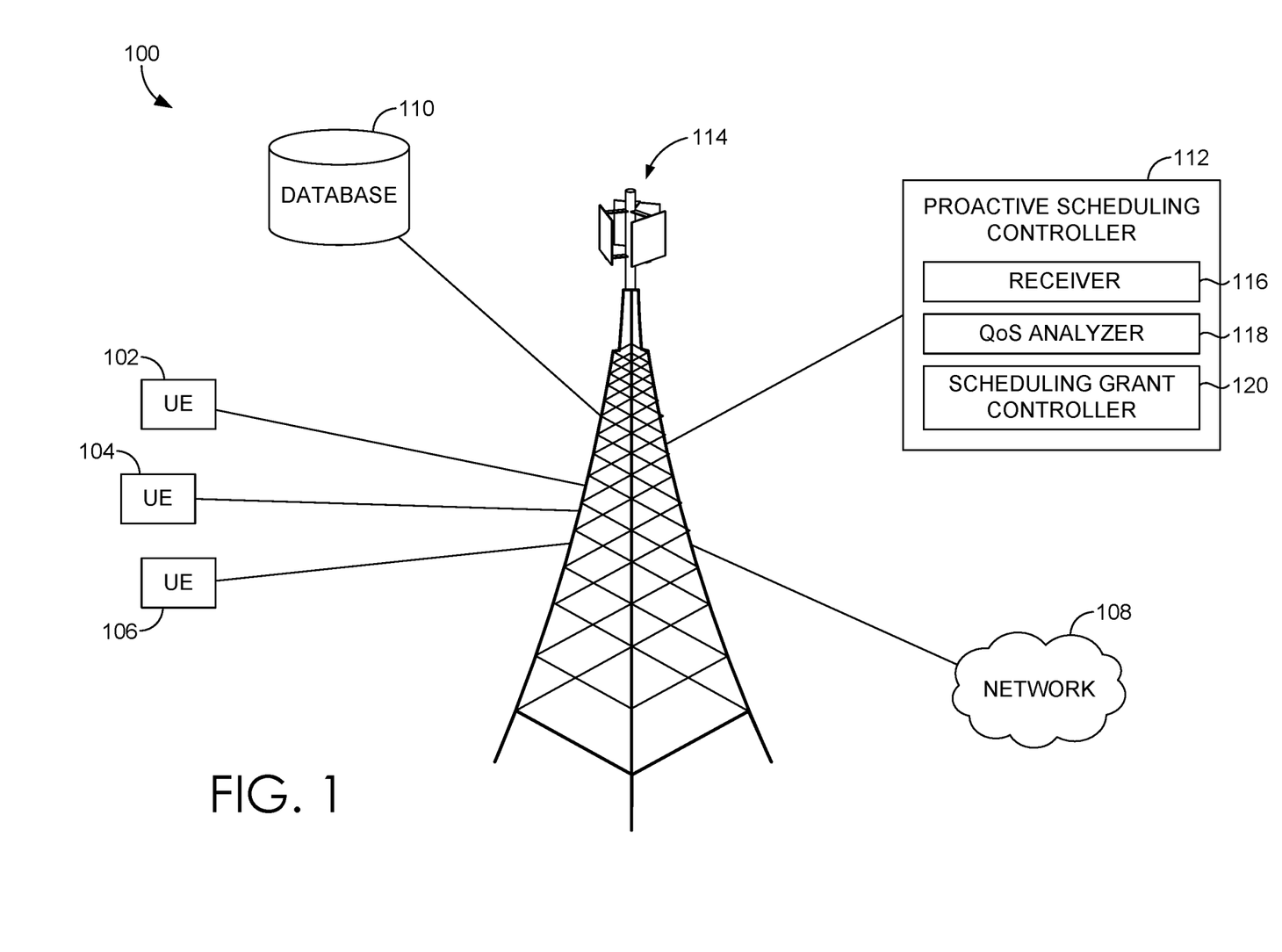
FIG. 1 illustrates a diagram of an exemplary network environment in which implementations of the present disclosure may be employed.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 of FIG. 1 includes user devices 102, 104, and 106, a cell site 114, a network 108, a database 110, and a proactive scheduling controller 112. In the network environment 100, the user devices 102, 104, and 106 may take on a variety of form, such as a PC, a user device, a smart phone, a smart watch, an IoT device, a laptop computer, a mobile phone, a mobile device, a tablet computer, a gaming device, a wearable computer, a PDA, a server, a CD player, an MP3 player, GPS device, a video player, a handheld communications device, a workstation, a router, an access point, and any combination of these delineated devices, or any other device that communicates via wireless communications with a cell site 114 in order to interact with network 108, which may be a public or a private network.

In some aspects, the user devices 102, 104, and 106 corresponds to a user device or a computing device. For example, the user device may include a display(s), a power source(s) (e.g., a battery), a data store(s), a speaker(s), memory, a buffer(s), a radio(s), and the like. In some implementations, the user devices 102, 104, and 106 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, WiMAX or any other type of network.

In some cases, the user devices 102, 104, and 106 in network environment 100 may optionally utilize network 108 to communicate with other computing devices (e.g., a mobile device(s), a server(s), a personal computer(s), etc.) through cell site 114. The network 108 may be a telecommunications network(s), or a portion thereof. A telecommunications network might include an array of devices or components (e.g., one or more base stations), some of which are not shown. Those devices or components may form network environments similar to what is shown in FIG. 1 and may also perform methods in accordance with the present disclosure. Components such as terminals, links, and nodes (as well as other components) may provide connectivity in various implementations. Network 108 may include multiple networks, as well as being a network of networks, but is shown in more simple form so as to not obscure other aspects of the present disclosure.

Network 108 may be part of a telecommunication network that connects subscribers to their service provider. In aspects, the service provider may be a telecommunications service provider, an internet service provider, or any other similar service provider that provides at least one of voice telecommunications and/or data services to user devices 102, 104, and 106 and any other UEs. For example, network 108 may be associated with a telecommunications provider that provides services (e.g., LTE) to the user devices 102, 104, and 106. Additionally or alternatively, network 108 may provide voice, SMS, and/or data services to user devices or corresponding users that are registered or subscribed to utilize the services provided by a telecommunications provider. Network 108 may comprise any communication network providing voice, SMS, and/or data service(s), using any one or more wireless communication protocols, such as a 1×circuit voice, a 3G network (e.g., CDMA, CDMA2000, WCDMA, GSM, UMTS), a 4G network (WiMAX, LTE, HSDPA), or a 5G (5G NR) network. The network 108 may also be, in whole or in part, or have characteristics of, a self-optimizing network.

In some implementations, cell site 114 is configured to communicate with the user devices 102, 104, and 106 that are located within the geographical area defined by a transmission range and/or receiving range of the radio antennas of cell site 114. The geographical area may be referred to as the "coverage area" or "coverage footprint" of the cell site or simply the "cell," as used interchangeably hereinafter.

Cell site 114 may include one or more base stations, base transmitter stations, radios, antennas, antenna arrays, power amplifiers, transmitters/receivers, digital signal processors, control electronics, GPS equipment, and the like. In particular, cell site 114 may be configured to wirelessly communicate with devices within a defined and limited geographical area. For the purposes of the present disclosure, it may be assumed that it is undesirable and unintended by the network 108 that the cell site 114 provide wireless connectivity to the user devices 102, 104, and 106 when the user devices 102, 104, and 106 are geographically situated outside of the cell associated with the cell site 114.

In an exemplary aspect, the cell site 114 comprises a base station that serves at least one sector of the cell associated with the cell site 114 and at least one transmit antenna for propagating a signal from the base station to one or more of the user devices 102, 104, and 106. In other aspects, the cell site 114 may comprise multiple base stations and/or multiple transmit antennas for each of the one or more base stations, any one or more of which may serve at least a portion of the cell. In some aspects, the cell site 114 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 114 is in communication with the proactive scheduling controller 112, which comprises various components that are utilized, in various implementations, to perform one or more methods for service based uplink scheduling in communication networks, such as on the cell site 114. In aspects, the proactive scheduling controller 112 may comprise a receiver 116, a QoS analyzer 118, and a scheduling grant controller 120. However, in some embodiments, other components than those shown in FIG. 1 may be utilized to carry out aspects of the systems and methods described herein. Each of the components or sub components of the proactive scheduling controller 112 may be a stand-alone or combined processor, server, or other computer processing component that is suitably configured to perform the operations described herein.

In various aspects, the receiver 116 of the proactive scheduling controller 112 is generally responsible for receiving information associated with one or more user devices, e.g., the user devices 102, 104, and/or 106. In aspects, the receiver 116 may receive a message or transmission comprising information associated with one or more user devices. In some embodiments, the information may be associated with a service level or "quality of service" (QoS) for the one or more user devices. For example, the information associated with one or more user devices may comprise data packets of transmitted data, in which the data packets comprise a value indicating a service level. The service level may be indicated in a header, data frame, and/or metadata associated with a data packet. In some embodiments, the information associated with the one or more user devices may comprise an indication of characteristics associated with uplink transmissions from the one or more user devices, such as size of transmitted data, type of transmitted data, device properties, data source, or any other information relevant to determining a service level for the one or more user devices. For example, the information associated with a particular device may indicate that the device is a game streaming device and corresponds to aan enhanced service level, while the information associated with another device may indicate that the uplink data transmitted by the device is voice data and may correspond to a normal or default service level. In some examples, the information associated with a device may comprise indications of multiple service levels. For instance, the received 116 may receive information associated with a particular device that indicates a higher service level (e.g., gaming, streaming), while also receiving information that indicates a lower service level (e.g., voice data).

In aspects, the QoS analyzer 118 utilizes and/or analyzes the information received from the receiver 116 to determine whether the service level indicated by the received information exceeds a service level threshold or otherwise indicates that proactive scheduling operations should be performed. In some embodiments, the service levels may be predetermined. For example, the service levels may correspond to a particular service level identifier which may be associated with various values associated with a particular QoS, such as priority level, error rate, and/or packet delay. The service level identifier may correspond to an index of proactive scheduling assignments that indicate various parameters associated with a service level, such as proactive scheduling schemes. As an example, the service level identifiers may be predefined as part of one or more communication standards, such as QoS Class Identifier (QCI) or 5G QoS Identifier (5QI), associated with 4G and 5G respectively.

In some embodiments, some service level identifier values may be associated with proactive scheduling schemes. For example, a 5QI value of 3 (e.g., real-time gaming) may be tagged and/or designated for proactive scheduling, while a 5QI value of 1 (e.g., conversational voice) may not be designated for proactive scheduling. In some embodiments, the may be multiple levels of proactive scheduling. For example, a 5QI value of 3 and a 5QI value of 4 may both be associated with proactive scheduling, but may differ on how the proactive scheduling is implemented.

In aspects, once the QoS Analyzer 118 has determined that the information received by the receiver 116 indicates that a service level associated with a user device exceeds a service level threshold and may be designated for proactive scheduling, the scheduling grant controller 118 may assign a proactive scheduling scheme in association with the device. The scheduling scheme may comprise any of a number of values or configurations for facilitating proactive scheduling operations. For example, the scheduling scheme may comprise a proactive scheduling frequency (e.g., scheduling frequency) and/or a proactive scheduling time (e.g., scheduling time). In some embodiments, a proactive scheduling frequency may define how often a scheduling grant will be given in association with a particular user device while proactive scheduling is in an active state for the user device. For example, the scheduling frequency may indicate that a scheduling grant should be issued every 50 ms. While a frequency is contemplated herein, it is not intended to be limiting, and any of a number of methods of scheduling a scheduling grant may be implemented, for example, a scheduling grant may be issued based on a periodicity and/or other periodic or aperiodic rate. In some aspects, a proactive scheduling time may be a value and/or expression that may define a length of time in which the proactive scheduling grants will be issued, or simply, how long the proactive scheduling mechanism will be active. For example, a proactive scheduling time may be a value that defines how long after the most recent uplink data packet was transmitted by a user device, for the proactive scheduling grants to be issued and/or for the proactive scheduling mechanism to remain in an active state.

In some aspects, once scheduling grant controller 118 assigns a proactive scheduling scheme in association with a user device, the proactive scheduling scheme may be transmitted to the user device by the base station of the cell site 114. For example, a base station of the cell site 114 may transmit a message to a user device, such as UE devices 102, 104, and 106 that may comprise information indicating the proactive scheduling scheme. In some embodiments, the user device may receive transmissions in accordance with the proactive scheduling time and/or the proactive scheduling frequency determined by the scheduling grant controller 118.

Although in some embodiments, information relating to the proactive scheduling scheme may be transmitted to a user device, in the same or other aspects, the proactive scheduling may be used by the cell site 114 to facilitate transmission operations with one or more user devices such as UE devices 102, 104, and 106. For example, a base station of the cell site 114 may use the proactive scheduling scheme to manage communication resources such as bandwidth. If the base station determines that it has limited bandwidth, it may cease proactive scheduling operations for one or more user device, even though those devices may have been designated for proactive scheduling.

Figure 2:
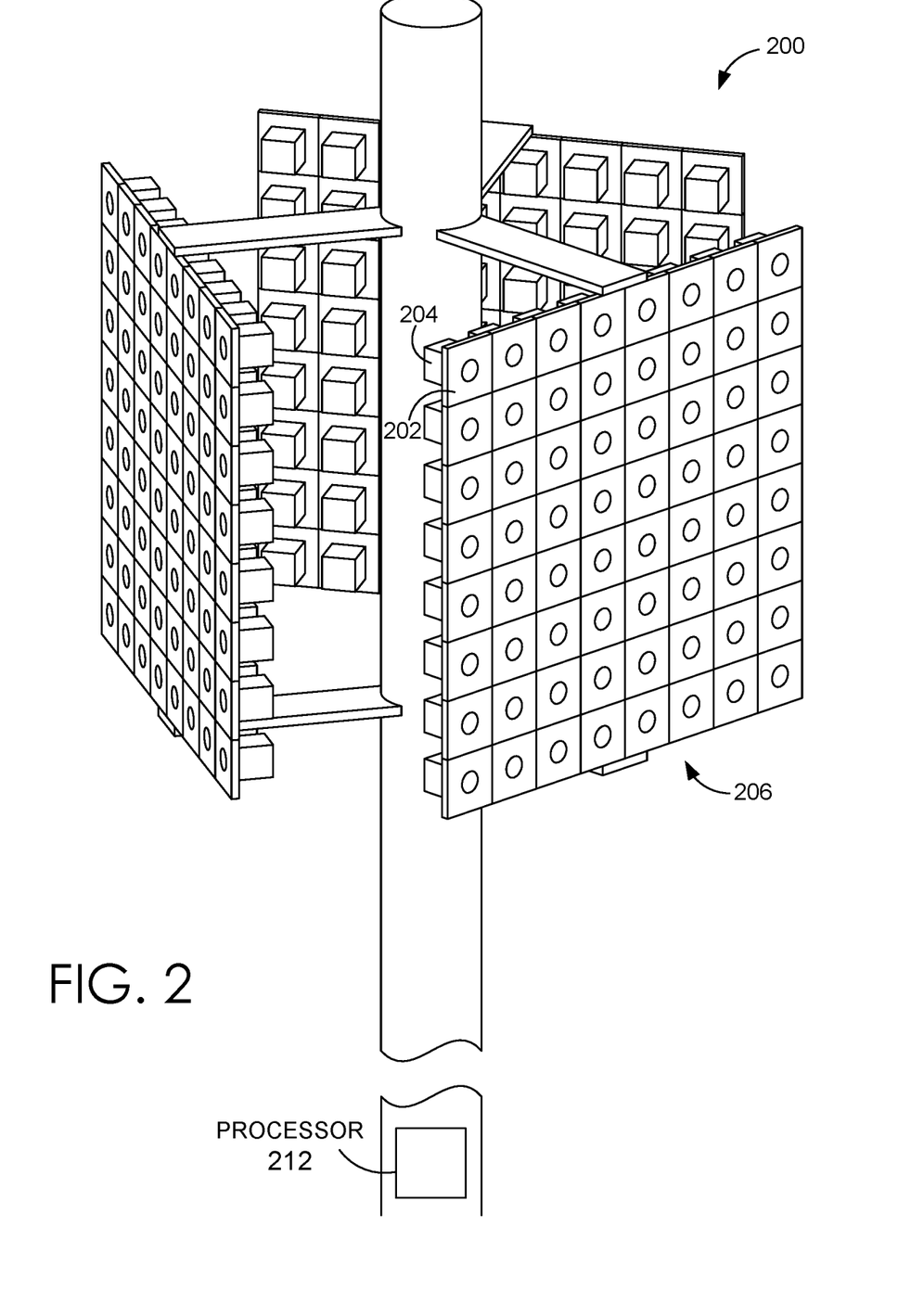
FIG. 2 depicts a schematic representation of a base station suitable for use in aspects of the present disclosure.

FIG. 2 depicts an example base station configuration suitable for use in implementing embodiments of the present disclosure and is designated generally as base station 200. Base station 200 is but one example of a suitable configuration and is not intended to suggest any limitations as to the scope of use or functionality of embodiments described herein. Neither should the configuration be interpreted as having any dependency or requirement relating to any one or combination of components illustrated.

Base station 200 comprises at least a first antenna array 206, the first antenna array 206 having one or more antenna elements 202. In aspects, the one or more antennas 202 may be dipole antennas, having a length, for example, of ¼, ½, 1, 1½, or any desired wavelength. In aspects, the antenna array 206 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

By way of a non-limiting example, the antenna array 206 may comprise antenna elements 202 arranged in a structure or grid. Although, the arrangement of the antenna elements 202 is depicted as a grid structure herein, the arrangement of the antenna elements 202 may have any of a number of structures, multi-planar positions, and vertical and/or horizontal arrangements. Each antenna element 202 of the antenna array 206 may comprise a dedicated power supply 204. The power supply 204 supplies power having a certain phase and amplitude to a respective antenna element 202. In an aspect, the power supply comprises a power amplifier. In various aspects, the power supply, e.g., the power supply 204, may additionally comprise a processor for controlling or adjusting the power supply to the respective antenna element 202.

In aspects, the base station 200 may further comprise a processor 212. In such aspects, the processor 212 may be any one or more convenient processors, servers, computer processing components, or the like, that can be configured to perform any one or more operations of the proactive scheduling controller 112 of FIG. 1. In some aspects, the processor 212 may be communicatively coupled to each antenna element 202. In aspects, as discussed above with respect to the proactive scheduling controller 112 of FIG. 1, the processor 212 of FIG. 2 may execute all or a part of the actions for assigning a proactive scheduling frequency and/or proactive scheduling time to one or more devices based on information associated with the one or more devices.

Figure 3:
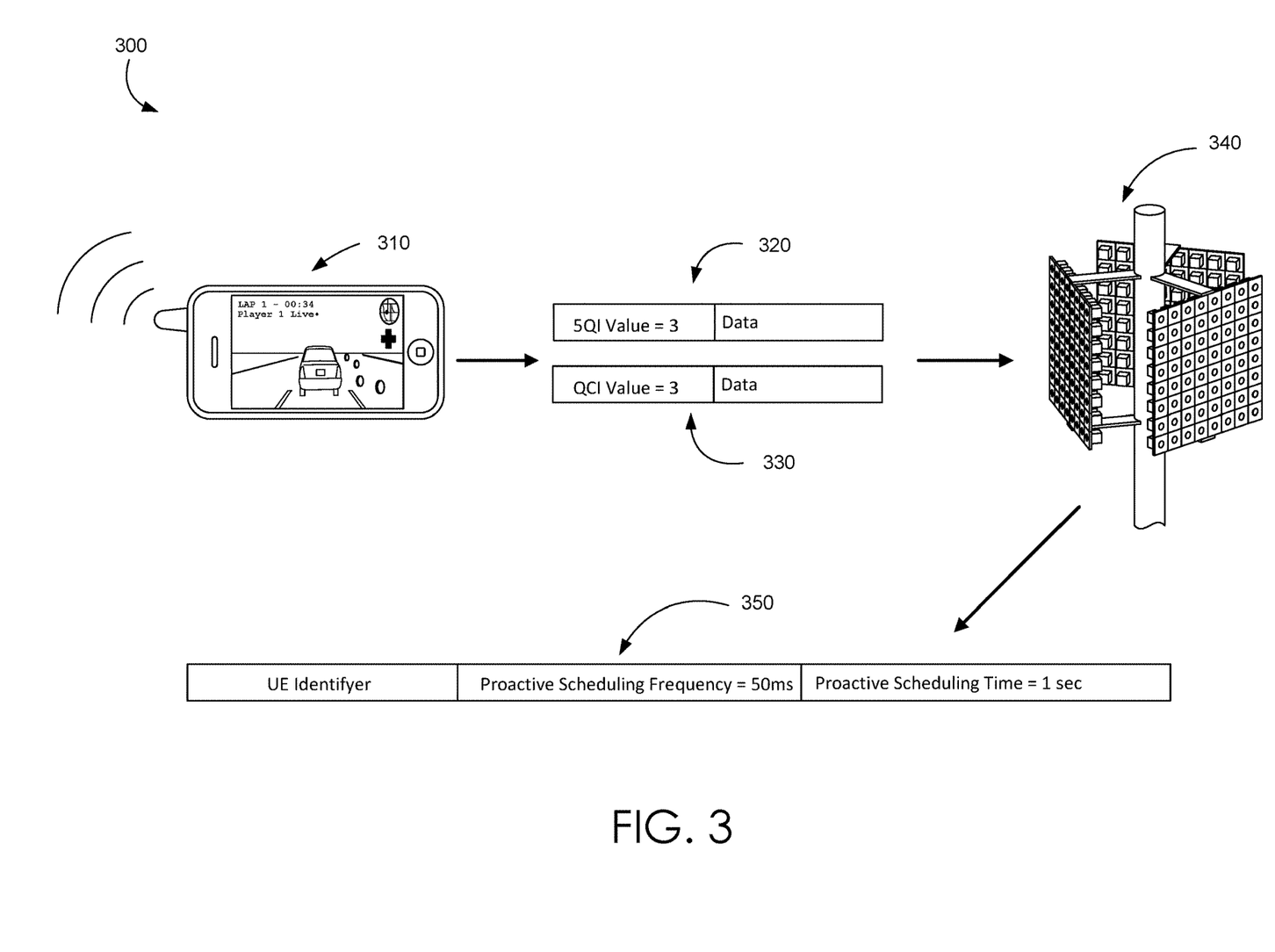
FIG. 3 depicts a system that includes a base station for providing wireless communication services to a plurality of user devices, in accordance with aspects herein.

FIG. 3. Depicts a system 300, e.g., a telecommunications system, which includes a base station 340 for providing wireless communication services to a plurality of user devices. In the aspect depicted in FIG. 3, the base station 340 can include any or all of the properties and parameters of the base station 200 described above with reference to FIG. 2 and/or the network environment 100, including the cell site 114, described above with reference to FIG. 1. In the aspect depicted in FIG. 3, the base station 340 is communicating with a UE device 310.

In aspects, as discussed above, the systems and methods disclosed here may receive information associated with one or more UE devices to identify a service level associated with the one or more UE devices to determine a proactive scheduling frequency and/or proactive scheduling time to assign to the one or more UE devices. As further discussed above, in aspects, the information indicating a service level for the one or more UE devices may be compared to a service threshold or table or index to determine whether a proactive scheduling frequency and/or time may be assigned.

For instance, in one example scenario, the UE device 310 may be running any number of applications and/or software processes that may comprise transmitting data to a network, such as network 108 depicted in FIG. 1. The UE device 310 may transmit data wirelessly using methods of RF communication with the base station 340. In such aspects, the transmitted data may comprise one or more data packets, such as data packets 320 and 330. For example, the UE device 310 may transmit one or more data packets associated with a real-time gaming application (e.g., online gaming, game streaming, etc.) that is running on the UE device 310. The one or more data packets may include a tag indicating a service level associated with the one or more data packets. In some embodiments, the one or more data packets may contain the tag indicating a service level, while in some embodiments, the tag indicating a service level may be located separately from the data packets and/or transmitted as part of a distinct transmission.

Data packets 320 and 330 may include a tag indicating a service level associated with the data packets. The tag may be any value and/or expression that may be used to indicate the service level. For example, the tag may be formatted according to a wireless communication standard. In one example scenario, the data packet 320 comprises data and a tag indicating a 5QI value of 3, which corresponds to a 5G communication standard, while the data packet 330 comprises data and a tag indicating QCI value of 3, which corresponds to a LTE communications standard.

In another example scenario, the base station 340 may receive one or more data packets, such as data packets 320 and 330. In response to the base station 340 receiving the data packets from the UE device 310, the proactive scheduling controller 112 of FIG. 1 may determine that the service level associated with the UE device 310, exceeds a service threshold. For example, the one or more processors 212 of FIG. 2, may compare the service level associated with the UE device to a table or threshold to determine whether the UE device 310 is a desired candidate for proactive scheduling and/or what proactive scheduling frequency and/or time may be assigned to the UE device 310. As another example and, as depicted in FIG. 3, the base station 340 may determine the 5QI value of 3, as included in data packet 320, is suitable for proactive scheduling operations and a proactive scheduling frequency and/or time should be assigned.

In an example scenario, the base station 340 may assign a proactive scheduling frequency and/or proactive scheduling time in association with the UE device 310. The base station 340 may assign a proactive scheduling frequency and/or proactive scheduling time as part of a configuration (or proactive scheduling scheme) for communication operations. The configurations including a proactive scheduling frequency and/or proactive scheduling time, may be implemented at the base station level and/or may be implemented across a portion or the entirety of a network, such as network 108 of FIG. 1. The proactive scheduling controller 112 of FIG. 1, may determine a proactive scheduling frequency and/or proactive scheduling time based on the service level associated with the UE device 310. For example, the base station 340 may assign a proactive scheduling frequency of 20 per second (i.e., every 50 ms) and a proactive scheduling time of 1 second in response to determining that the UE device 310 is transmitting data packets associated with 5QI or QCI values of 3. In some embodiments, the assigned proactive scheduling frequency and/or the proactive scheduling time may be transmitted by the base station 340 to the UE device 310 and/or any other recipients such as other base stations, other UE devices, and any device or equipment communicating using a network, such as network 108 of FIG. 1.

Figure 4:
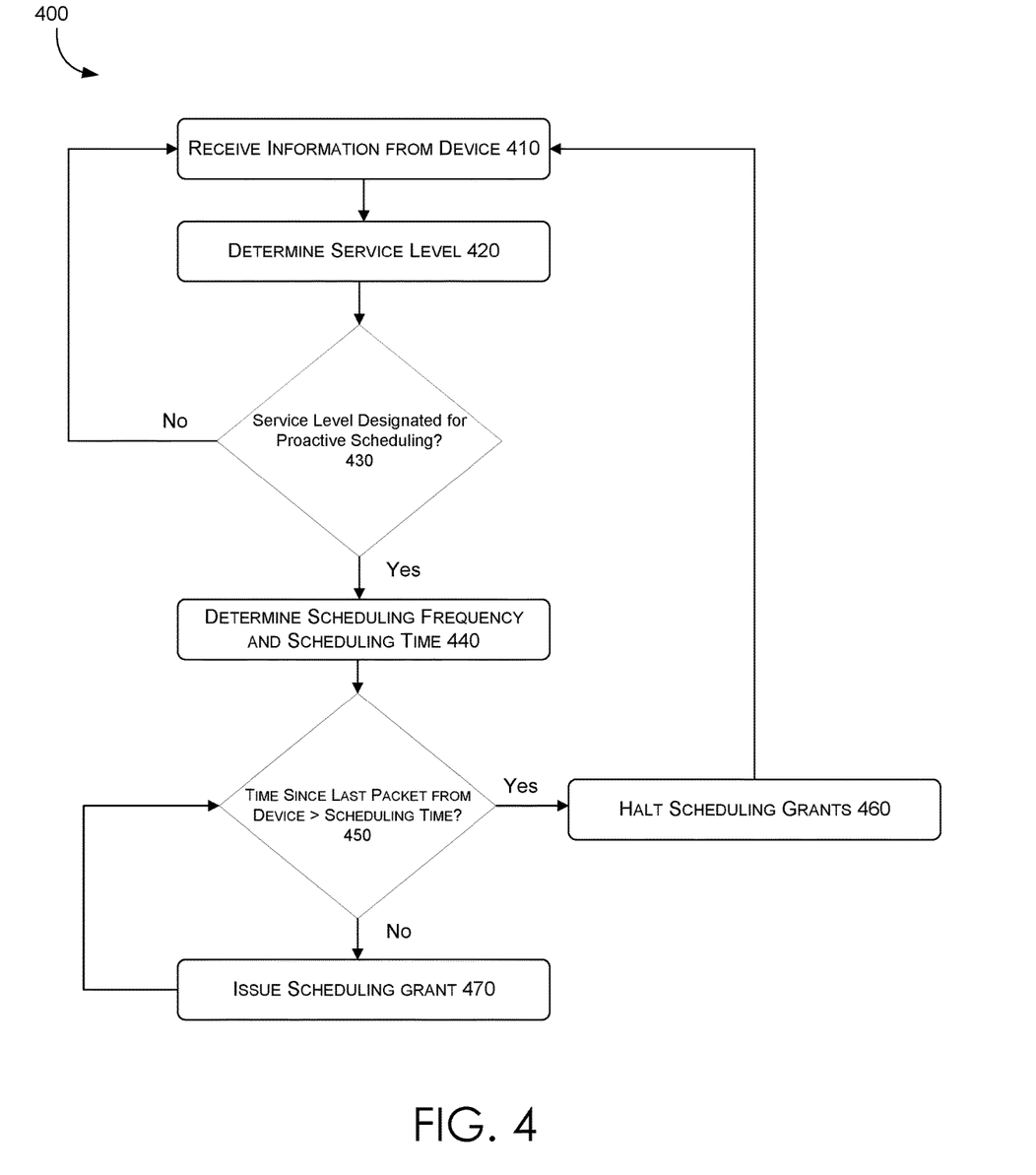
FIG. 4 depicts a flow diagram illustrating an example method 400 for service based uplink scheduling in communication networks, in accordance with aspects herein.

FIG. 4 is a flow diagram illustrating an example method 400 for service based uplink scheduling in communication networks. It should be understood that while FIG. 4 depicts just one particular arrangement and/or order of steps, other arrangements and/or orders of steps are possible and contemplated by the disclosed herein. For instance, one or more of the steps depicted in FIG. 4, may be performed in a different order or otherwise omitted.

At step 410 of the method 400, information may be received from a device, such as UE device 310 of FIG. 3. The information may include uplink data, device information, signal quality information, measurement information, etc. The information may also include a value or parameter that indicates a service level associated with the device. For example, the service level may be associated with particular uplink transmission, the particular device, a subscription or service associated with a particular user of a device, and/or a combination thereof. The information may include a value indicating a service level associated with data transmitted in association with a particular application or software process of the device. For example, a real-time gaming application may be associated with uplink data comprising a value indicating an enhanced service level, while a messaging application may be associated with uplink data comprising a value indicating a typical or default service level.

At step 420 of method 400, a service level is determined. In some embodiments the service level is determined from the information received in association with a device. For example, a base station may determine a service level from uplink data transmissions from a UE device. In some embodiments, the service level is indicated or tagged explicitly in the information received from a device, while in other embodiments a service level may be calculated, or otherwise, estimated from any of a number of factors associated with the device. For example, a service level may be determined based on device type, device data rate, historical device activity, uplink data type, location information, signal measurements associated with a device, or any other information relevant to differentiating the service levels associated with a device.

At step 430 of the method 400, it is determined whether the service level determined in step 420 is designated for proactive scheduling. In some embodiments, only some of the service levels of a set of all possible service levels may be designated for proactive scheduling. As just one example, a service level corresponding to 5QI values of 3, 4, and 65 may have been designated for proactive scheduling, while a service level corresponding to 5QI values of 1, 2, and 66 may not have been designated for proactive scheduling. In some embodiments, the operator of a communication system may determine a proactive scheduling designation for each service level that indicates whether or not proactive scheduling is applicable for that particular service level. In some embodiments, if it is determined that the service level determined in step 420 is not designated for proactive scheduling, no further steps for establishing proactive scheduling will be performed and communication with the device will proceed using the existing protocol. In some embodiments, if it is determined that the service level determined in step 420 is designated for proactive scheduling, a scheduling frequency and scheduling time may be determined.

At step 440 of method 400, a scheduling frequency and scheduling time may be determined. As discussed above with respect to FIG. 3, a scheduling frequency indicates a frequency, or period, by which proactive scheduling grants are issued in relation to a UE device. The scheduling grants may act to prevent de-activation of an established communication connection between the UE device and one or more base stations. The scheduling time may indicate a period or duration of time in which the scheduling grants may be issued. For example, the scheduling time of 1 second, and a scheduling frequency of 20/second, would cause a scheduling grant to be issued every 50 ms during the 1 second duration. In some embodiments, the scheduling time may indicate a period of time since the last "real" or non-grant uplink data packet was transmitted by a UE device. The determined scheduling time and the determined scheduling frequency may be included as part of a proactive scheduling scheme. In some embodiments, the scheduling scheme associated with a particular UE device may be store, such as in database 110 of FIG. 1, to be retrieved when proactive scheduling procedures are re-activated for a UE device (e.g., after a timeout, different service level transmission, etc.). The proactive scheduling scheme may be assigned to, and/or assigned in association with, the UE device. Assigning a proactive scheduling scheme to a device may comprise instructing one or more base stations to perform operations in accordance to the proactive scheduling scheme in relation to the UE device. Assigning a proactive scheduling scheme to a device may comprise transmitting downlink data to the UE device that indicates parameters of the proactive scheduling scheme such as scheduling time and scheduling frequency.

At step 450 of method 400, the time since the most recent uplink data packet from the UE device is compared to the scheduling time determined in step 440. In some embodiments, if the time that has elapsed since the last uplink data packet was sent is greater than the determined scheduling time, proactive scheduling operations, such as issuing scheduling grants, may be halted and/or deactivated. For example, if it has been 1.2 seconds since the last uplink data packet was sent by the UE device, and the scheduling time determined for the service level associated with the UE device is 1 second, scheduling grants may stop being issued in association with the UE device, such as in step 460. If the time elapsed since the last uplink data packet was sent is less than the scheduling time determined in step 440, scheduling grants may continue to be issued in accordance to the scheduling frequency determined in step 440.

At step 470 of method 400, scheduling grants are issued in association with the UE device. The scheduling grants may be issued in accordance with a proactive scheduling scheme, which may include a scheduling time and a scheduling frequency, as determined in step 440. As mentioned above, the scheduling grants may act to prevent de-activation of an established communication connection between the UE device and one or more base stations. The scheduling grants may further facilitate prioritizing the uplink transmissions from a particular UE device in relation to other UE devices that may be transmitting uplink data to the one or more base stations.

Figure 5:
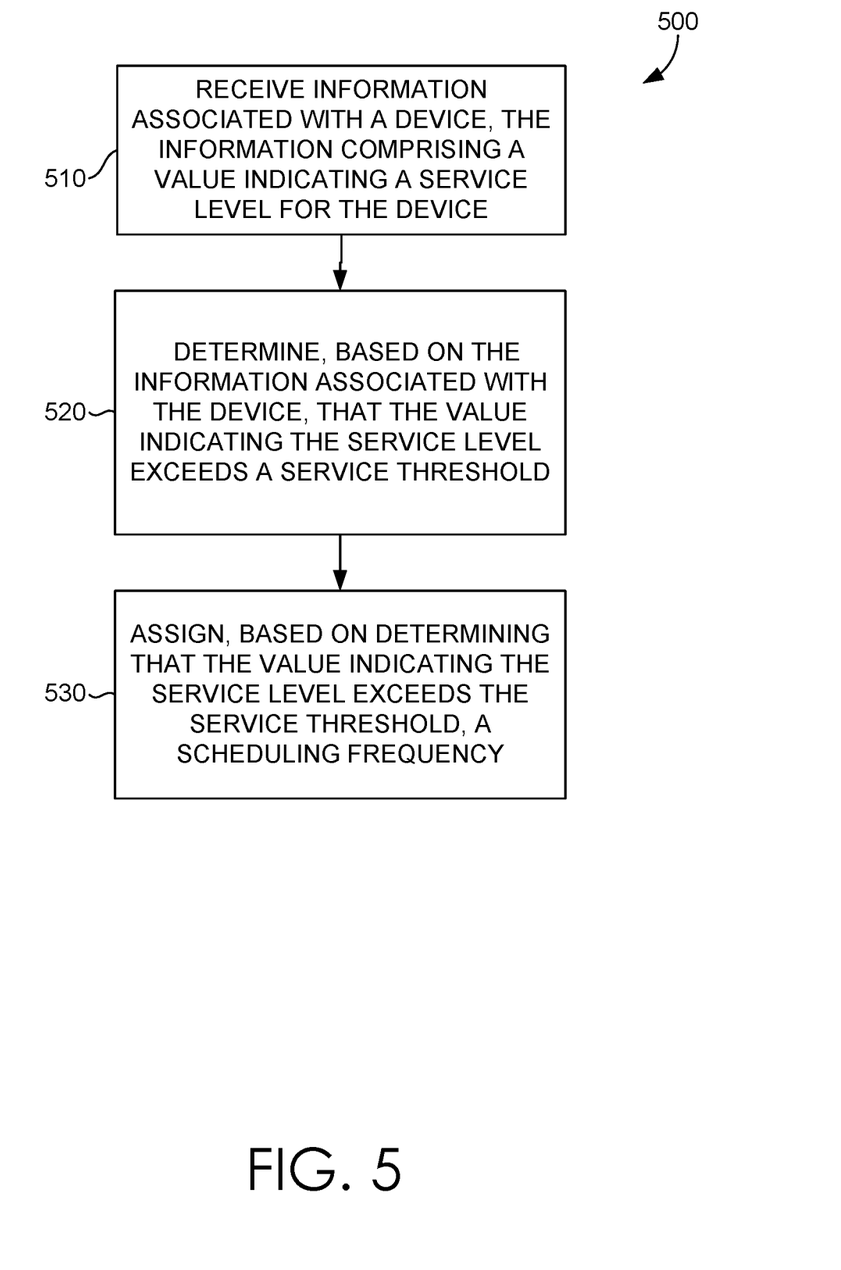
FIG. 5 depicts a flow chart of a method 500 for service based uplink scheduling in communication networks, in accordance with aspects of the present disclosure.

FIG. 5 is a flow chart of a method 500 for service based uplink scheduling in communication networks. In step 510 of the method 500, information associated with one or more devices, e.g., UEs, is received. In aspects, the information can be received by the receiver 116 of the proactive scheduling controller 112 of the system 100 discussed above with reference to FIG. 1. In various aspects, the information associated with a device can comprise a value or parameter indicating a service level for the device. For example, the information may include a QCI or 5QI value indicating a particular service level.

Step 520 of the method 500, includes determining, based on the information associated with the device, that the value indicating the service level exceeds a service threshold. In aspects, the service threshold may be based on predetermined service levels. In some aspects, it may be determined if the value indicating a service level is designated for proactive scheduling. For example, the step 520 may be performed via the QoS analyzer 118 of the proactive scheduling controller 112 of the system 100 discussed above with reference to FIG. 1.

Step 530 of the method 500 includes assigning, based on determining that the value indicating the service level exceeds the service level, a scheduling frequency. In some aspects, the step 530 is performed after determining that the value indicating a service level for the device exceeds a threshold or otherwise is designated for proactive scheduling. In certain aspects, the scheduling grant controller 120 of the proactive scheduling controller 112 of the system 100 described above with reference to FIG. 1 can be utilized to perform the step 530. In certain aspects, as discussed above, a scheduling frequency may be assigned as part of a proactive scheduling scheme that may further comprise a scheduling time.

Figure 6:
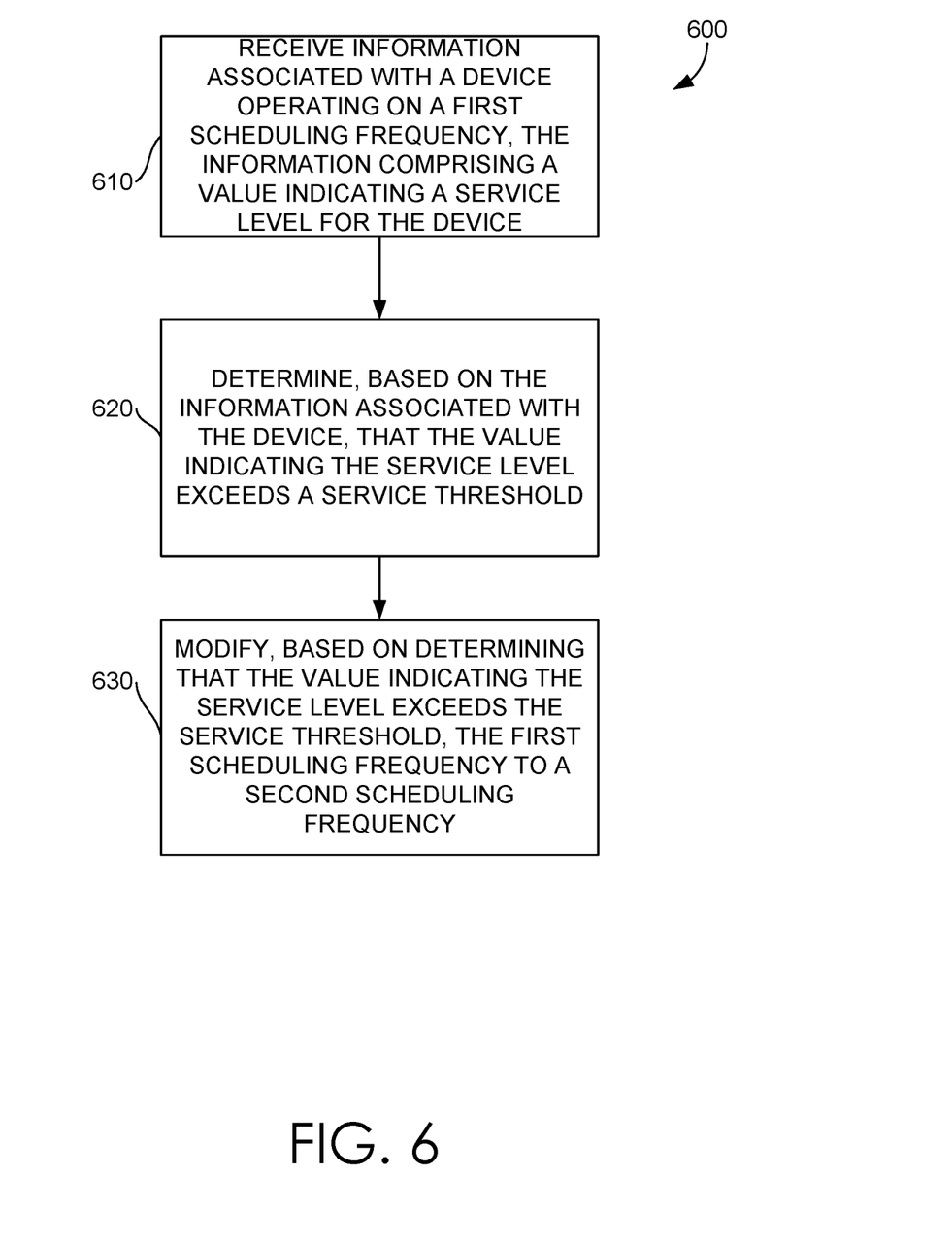
FIG. 6 depicts a flow chart of a method 600 for service based uplink scheduling in communication networks, in accordance with aspects of the present disclosure.

FIG. 6 is a flow chart of a method 600 for service based uplink scheduling in communication networks. In step 610 of the method 600, information associated with a device, e.g., UE device, is received. In aspects, the information can be received by the receiver 116 of the proactive scheduling controller 112 of the system 100 discussed above with reference to FIG. 1. In various aspects, the information associated with the device may comprise a value and/or parameter indicating a service level for the device. In the same or alternative aspects, the device may be operating according to a first scheduling frequency.

Step 620 of the method 600, includes determining that the value indicating a service level exceeds a service threshold. In some aspects, it may be determined if the value indicating the service level is designated for proactive scheduling. The same or alternative aspects, determining that the value indicating the service level exceeds a service threshold may comprise accessing an index of proactive scheduling assignments associated with a plurality of service levels. For example, the step 620 may be performed via the QoS analyzer 118 of the proactive scheduling controller 112 of the system 100 discussed above with reference to FIG. 1.

Step 630 of the method 600 includes modifying the first scheduling frequency to a second scheduling frequency. In aspects, the step 630 is performed based on determining that the value indicating the service level exceeds the service threshold, as in step 620. In certain aspects, the scheduling grant controller 120 of the proactive scheduling controller 112 of the system 100 described above with reference to FIG. 1 can be utilized to perform the step 630. In certain aspects, as discussed above, the first scheduling frequency and the second scheduling frequency may be assigned as part of a proactive scheduling scheme that may further comprise a scheduling time.

Figure 7:
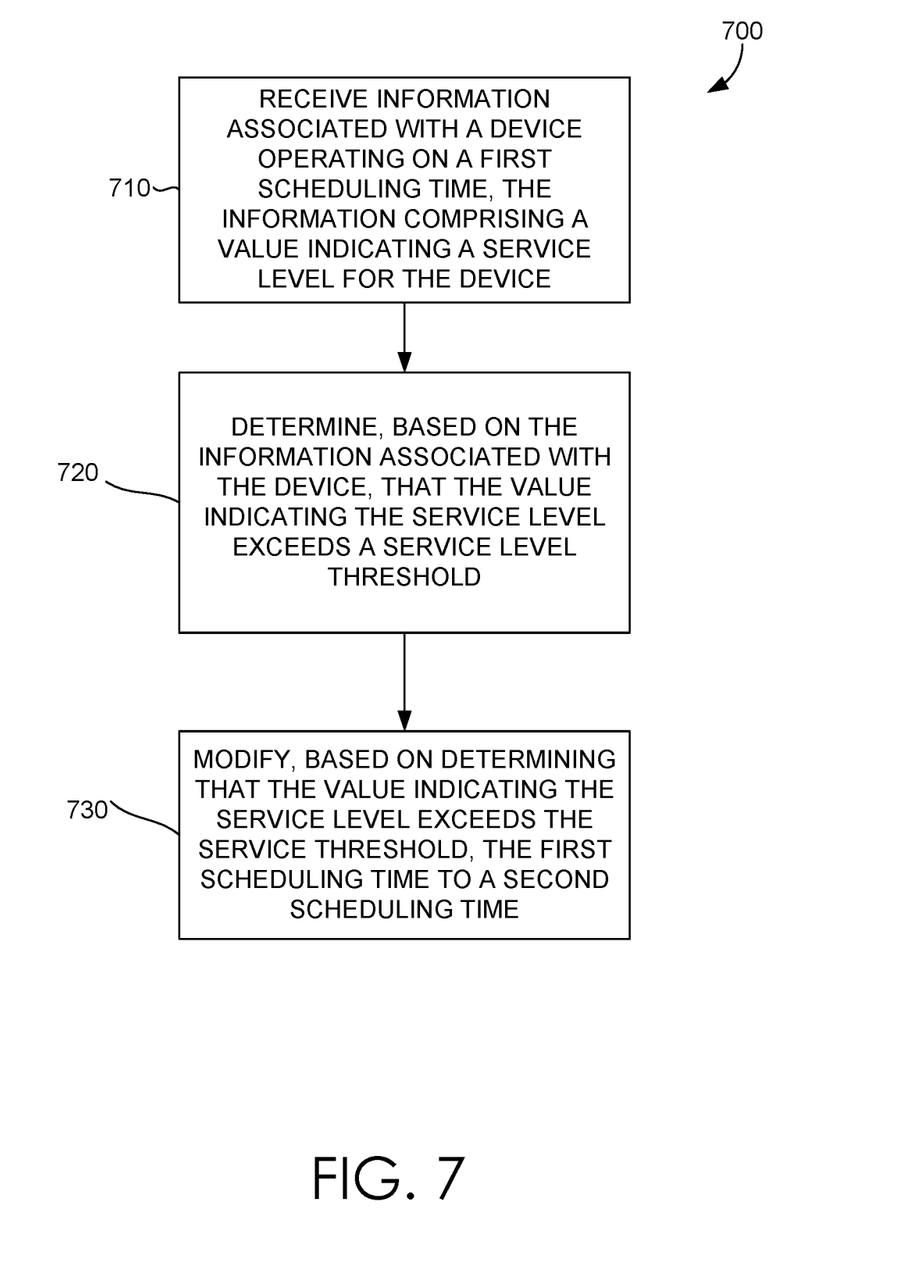
FIG. 7 depicts a flow chart of a method 700 for service based uplink scheduling in communication networks, in accordance with aspects of the present disclosure.

FIG. 7 is a flow chart of a method 700 for service based uplink scheduling in communication networks. In step 710 of the method 700, information associated with a device, e.g., UE device, is received. In aspects, the information can be received by the receiver 116 of the proactive scheduling controller 112 of the system 100 discussed above with reference to FIG. 1. In various aspects, the information associated with the device may comprise a value and/or parameter indicating a service level for the device. In the same or alternative aspects, the device may be operating according to a first scheduling time.

Step 720 of the method 700, includes determining that the value indicating a service level exceeds a service threshold. In some aspects, it may be determined if the value indicating the service level is designated for proactive scheduling. The same or alternative aspects, determining that the value indicating the service level exceeds a service threshold may comprise accessing an index of proactive scheduling assignments associated with a plurality of service levels. For example, the step 720 may be performed via the QoS analyzer 118 of the proactive scheduling controller 112 of the system 100 discussed above with reference to FIG. 1.

Step 730 of the method 700 includes modifying the first scheduling time to a second scheduling time. In aspects, the step 730 is performed based on determining that the value indicating the service level exceeds the service threshold, as in step 720. In certain aspects, the scheduling grant controller 120 of the proactive scheduling controller 112 of the system 100 described above with reference to FIG. 1 can be utilized to perform the step 730. In certain aspects, as discussed above, the first scheduling time and the second scheduling time may be assigned as part of a proactive scheduling scheme that may further comprise a scheduling frequency.

Figure 8:
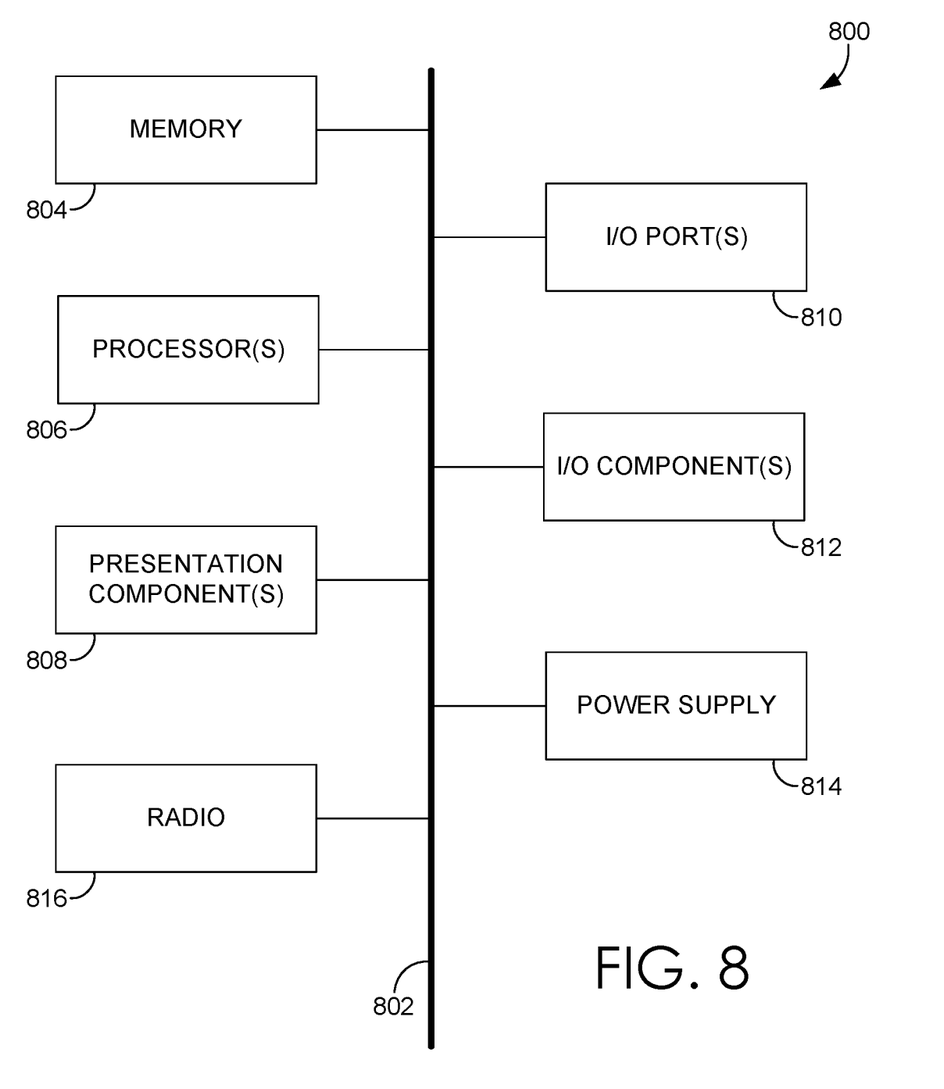
FIG. 8 depicts a diagram of an exemplary computing environment suitable for use in implementations of the present disclosure.

Referring now to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, power supply 814 and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component, such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Exemplary memory includes solid-state memory, hard drives, optical-disc drives, etc. Computing device 800 includes one or more processors 806 that read data from various entities, such as bus 802, memory 804, or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices, including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for assigning uplink resources, the method comprising:
   receiving a first communication at a serving cell from a first device, the first communication comprising a value indicating a service level for the first device;
   receiving a second communication at the serving cell from a second device, the second communication comprising a value indicating a service level for the second device;
   determining, based on the first communication and the second communication, that the service level for the first device is designated for proactive uplink scheduling and that the second service level is not designated for proactive uplink scheduling;
   based on said determinations, assigning a determined scheduling time and a determined scheduling frequency to the first device and not to the second device; and
   wherein assigning the determined scheduling time and the determined scheduling frequency to the first device instructs the first device to communicate "dummy" data packets at a pre-determined frequency.

2. The method of claim 1, wherein the value indicating the service level comprises a quality of service tag.

3. The method of claim 1, wherein assigning a determined scheduling time and a determined scheduling frequency prevents de-activation of a communication connection between the first device and a base station.

4. The method of claim 3, wherein determining that the service level for the first device is designated for the proactive scheduling scheme further comprises accessing an index of proactive scheduling assignments associated with a plurality of qualities of service and determining a quality of service of the plurality of qualities of service that corresponds with the quality of service value associated with the first device.

5. One or more non-transitory computer-readable media having computer-executable instructions embodied thereon that, when executed, perform a method for dynamically assigning uplink resources, the method comprising:
   receiving a first communication at a serving cell from a first device, the first communication comprising a value indicating a service level for the device;
   receiving a second communication at the serving cell from a second device, the second communication comprising a value indicating a service level for the second device;
   determining, based on the first communication and the second communication, that the service level for the first device is designated for proactive uplink scheduling and that the second service level does is not designated for proactive uplink scheduling;
   based on said determinations, assigning a determined scheduling time and a determined scheduling frequency to the first device and not to the second device; and
   wherein assigning the determined scheduling time and determined scheduling frequency to the first device instructs the first device to communicate "dummy" packets at a pre-determined frequency.

6. The non-transitory media of claim 5, wherein the value indicating the service level is determined based on:
   a device type, and
   a device data rate, and
   historical device activity, and
   uplink data type, and
   location information; and
   signal measurements associated with a device.

7. The non-transitory media of claim 5, wherein assigning a determined scheduling time and a determined scheduling frequency prevents de-activation of a communication connection between the first device and a base station.

8. The non-transitory media of claim 7, wherein determining that the service level for the first device is designated for the proactive scheduling scheme further comprises accessing an index of proactive scheduling assignments associated with a plurality of service levels and determining a service level of the plurality of service levels that corresponds with the quality of service value associated with the first device.

9. A system for assigning a scheduling frequency to a device, the system comprising one or more processors configured to execute operations comprising:
   receiving, by the one or more processors, a first communication at a serving cell from a first device, the first communication comprising a value indicating a service level for the device;
   receiving a second communication at the serving cell from a second device, the second communication comprising a value indicating a service level for the second device;
   determining, by the one or more processors, based on the first communication and the second communication, that the service level for the first device is designated for proactive uplink scheduling and that the second service level does is not designated for proactive uplink scheduling,
   based on said determinations, assigning a determined scheduling time and a determined scheduling frequency to the first device and not to the second devices and
   wherein assigning the determined scheduling time and determined scheduling frequency to the first device instructs the first device to communicate "dummy" packets at a pre-determined frequency.

10. The system of claim 9, wherein assigning a determined scheduling time and a determined scheduling frequency prevents de-activation of a communication connection between the first device and a base station.

* * * * *